(12) United States Patent
Ding et al.

(10) Patent No.: US 9,325,996 B2
(45) Date of Patent: Apr. 26, 2016

(54) METHOD AND APPARATUS FOR IMAGE COMPRESSION

(71) Applicant: Tencent Technology (Shenzhen) Company Limited, Shenzhen (CN)

(72) Inventors: Shouhong Ding, Shenzhen (CN); Chuannan Wang, Shenzhen (CN); Jia Wang, Shenzhen (CN); Baolong Yang, Shenzhen (CN); Zhifeng Xie, Shenzhen (CN); Shang Wu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 14/713,506

(22) Filed: May 15, 2015

(65) Prior Publication Data

US 2015/0249830 A1 Sep. 3, 2015

Related U.S. Application Data

(63) Continuation of application No. PCT/CN2013/086478, filed on Nov. 4, 2013.

(30) Foreign Application Priority Data

Nov. 15, 2012 (CN) .......................... 2012 1 0460468

(51) Int. Cl.
| | |
|---|---|
| *H04N 19/126* | (2014.01) |
| *H04N 19/172* | (2014.01) |
| *H04N 19/196* | (2014.01) |
| *H04N 19/12* | (2014.01) |

(Continued)

(52) U.S. Cl.
CPC ............. *H04N 19/126* (2014.11); *H04N 19/12* (2014.11); *H04N 19/154* (2014.11); *H04N 19/172* (2014.11); *H04N 19/192* (2014.11); *H04N 19/196* (2014.11); *H04N 19/197* (2014.11)

(58) Field of Classification Search
CPC ... H04N 19/12; H04N 19/126; H04N 19/154; H04N 19/172; H04N 19/192; H04N 19/196; H04N 19/197; G06F 17/3053; G06K 9/6224
See application file for complete search history.

(56) References Cited

U.S. PATENT DOCUMENTS 7,627,564 B2 * 12/2009 Yao ...................... G06F 17/3053
7,961,986 B1 *  6/2011 Jing .................. G06F 17/30265
382/305

(Continued)

FOREIGN PATENT DOCUMENTS

| CN | 1250318 A | 4/2000 |
|---|---|---|
| CN | 102226920 A | 10/2011 |

*Primary Examiner* — Jingge Wu
(74) *Attorney, Agent, or Firm* — Morgan, Lewis & Bockius LLP (57) ABSTRACT

The present disclosure discloses method and apparatus for image compression. The method includes: acquiring a threshold of a similarity score of an image; acquiring a first quality factor of the image, a first similarity score corresponding to the first quality factor, a second quality factor of the image, and a second similarity score corresponding to the second quality factor; obtaining a functional relationship between quality factor and similarity score of the image by means of curve fitting using the first quality factor, the first similarity score, the second quality factor, and the second similarity score; determining an optimum quality factor of the image according to the functional relationship between the quality factor and the similarity score and the threshold of the similarity score; and compressing the image according to the determined optimum quality factor. With the present disclosure, iterations in image compression can be completed in a very short time.

14 Claims, 5 Drawing Sheets

(51) Int. Cl.
    *H04N 19/154*    (2014.01)
    *H04N 19/192*    (2014.01)

(56) References Cited

U.S. PATENT DOCUMENTS 8,898,151 B2 * 11/2014 Lee .................. G06F 17/30699
                                                         707/723
9,135,250 B1 * 9/2015 Duddu .............. G06F 17/30011
2012/0127350 A1    5/2012 Alfonso
2012/0201475 A1 * 8/2012 Carmel ................ H04N 19/172
                                                         382/238
2012/0201476 A1 * 8/2012 Carmel ................ H04N 19/176
                                                         382/239
2012/0281924 A1 * 11/2012 Coulombe ............. H04N 19/85
                                                         382/218

* cited by examiner

METHOD AND APPARATUS FOR IMAGE COMPRESSION

RELATED APPLICATIONS

This application is a continuation application of PCT Patent Application No. PCT/CN2013/086478, entitled "METHOD AND APPARATUS FOR IMAGE COMPRESSION" filed on Nov. 4, 2013, which claims priority to Chinese Patent Application No. 201210460468.X, filed with the Chinese Patent Office on Nov. 15, 2012 and entitled "METHOD AND APPARATUS FOR IMAGE COMPRESSION", both of which are incorporated by reference in their entirety.

FIELD OF THE TECHNOLOGY

The present disclosure relates to the field of computer technologies, and in particular, to method and apparatus for image compression.

BACKGROUND OF THE DISCLOSURE

With the development of Internet technologies and with an increase in proportion of image use on the Internet, image transmission on the Internet becomes increasingly important. Due to the limitation in bandwidth and traffic, an image needs to be compressed before being transmitted on the Internet, to facilitate transmission of the image, and therefore, it is increasingly important perform lossless compression on images to be transmitted on the Internet.

In the conventional technology, a quality factor (which is referred to as "q" for short) is generally used to indicate the quality of an image that is compressed by using the quality factor of the image. A larger value of q indicates higher quality of image compression, and in this case, the compressed image occupies relatively large space; and a smaller value of q indicates lower quality of compression, and in this case, the compressed image occupies relatively small space. For example, for a jpeg-format image generally used in the conventional technology, an empirical initial value q is usually set for the image in the conventional technology, so as to compress the jpeg-format image according to the empirical initial value q. For example, a value range of q may be 0 to 100. At the same time, a score (which is referred to s for short) value of image similarity is further introduced in the conventional technology. The value of s indicates a score of similarity, which is obtained by means of objective evaluation, between a compressed image and an original jpeg-format image after the jpeg-format image is compressed by using the value of q, and may also be interpreted as a score of the quality of a compressed jpeg-format image perceived by human eyes. For example, a value range of s may be 0 to 1. The value of s is generally in direct proportion to the value of q; a larger value of s indicates higher quality of a compressed image and higher similarity between the compressed image and an original image, and corresponds to a larger value of q and a larger compressed jpeg-format image; and a smaller value of s indicates lower quality of a compressed image and lower similarity between the compressed image and an original image, and corresponds to a smaller value of q, and a smaller compressed jpeg-format image. In the conventional technology, generally, a preset threshold is set for s. First, a jpeg-format image is compressed and encoded according to a preset empirical initial value q; then, it is analyzed whether the value of s of the compressed and encoded image is less than the preset threshold of s, and if the value of s is not less than the preset threshold of s, the value of q is reduced correspondingly, and the jpeg-format image is compressed and encoded again; then it is analyzed whether the value of s of the compressed and encoded image is less than the preset threshold of s; the process is repeated until the value of s of the compressed and encoded image is less than the preset threshold of s, and then, the compressed and encoded image is output, so as to transmit the image.

In a process of implementing the present disclosure, the inventor finds that the conventional technology at least has the following problem: a preset empirical initial value q in the conventional technology is set completely according to experience. To acquire a compressed image, iteration and corresponding compression need to be performed multiple times according to the preset empirical initial value q until the value of s is converged. Therefore, in the image compression solution in the conventional technology, an improper preset empirical initial value q leads to a long compression time and low efficiency in image compression.

SUMMARY

To solve the problem of the conventional technology, embodiments of the present disclosure provide method and apparatus for image compression. The technical features are as follows:

According to an aspect of the present disclosure, an image compression method includes:

acquiring a threshold of a similarity score of an image;

acquiring a first quality factor of an image, and a first similarity score corresponding to the first quality factor, a second quality factor of the image, and a second similarity score corresponding to the second quality factor;

obtaining a functional relationship between a quality factor and a similarity score by means of curve fitting using the first quality factor, the first similarity score, the second quality factor, and the second similarity score;

determining an optimum quality factor of the image according to the functional relationship between the quality factor and the similarity score and a threshold of the similarity score; and compressing the image according to the determined optimum quality factor.

According to another aspect of the present disclosure, an image compression apparatus includes one or more processors; memory; and one or more program modules stored in the memory and to be executed by the one or more processors, the one or more program modules further including:

a threshold acquiring module, configured to acquire a threshold of a similarity score of an image;

a first acquiring module, configured to acquire a first quality factor of the image, a first similarity score corresponding to the first quality factor, a second quality factor of the image, and a second similarity score corresponding to the second quality factor;

a curve fitting module, configured to obtain a functional relationship between quality factor and similarity score of the image by means of curve fitting using the first quality factor, the first similarity score, the second quality factor, and the second similarity score;

a second acquiring module, configured to determine an optimum quality factor of the image according to the functional relationship between the quality factor and the similarity score and the threshold of the similarity score; and an image compression module, configured to compress the image according to the determined optimum quality factor.

In some embodiments, in the image compression apparatus described above, the curve fitting module is specifically configured to determine a Gaussian functional relationship between the quality factor and the similarity score according to the first quality factor, the first similarity score, the second quality factor, the second similarity score, and the Gaussian function; and the second acquiring module is specifically configured to determine the optimum quality factor of the image according to the Gaussian functional relationship between the quality factor and the similarity score and the threshold of the similarity score.

In some embodiments, in the image compression apparatus described above, the curve fitting module is specifically configured to separately use the first quality factor and the first similarity score, and the second quality factor and the second similarity score as values of two end points of the Gaussian function; determine a coefficient parameter of the Gaussian function; and determine the Gaussian functional relationship between the quality factor and the similarity score according to the coefficient parameter of the Gaussian function.

In some embodiments, in the image compression apparatus described above, the second acquiring module includes:

a calculating unit, configured to calculate an initial value of the quality factor of the image by substituting the threshold of the similarity score into the Gaussian functional relationship between the quality factor and the similarity score;

an acquiring unit, configured to acquire a similarity score corresponding to the initial value of the quality factor by means of objective evaluation;

a determining unit, configured to determine whether the similarity score corresponding to the initial value of the quality factor of the image is greater than the threshold of the similarity score; and a processing unit, configured to reduce the initial value of the quality factor of the image when the determining unit determines that the similarity score corresponding to the initial value of the quality factor of the image is greater than the threshold of the similarity score, until a similarity score corresponding to a reduced initial value of the quality factor of the image is less than or equal to the threshold of the similarity score, and use the reduced initial value of the quality factor of the image as the optimum quality factor of the image.

In some embodiments, in the image compression apparatus described above, the processing unit is further configured to increase the initial value of the quality factor of the image when the determining unit determines that the similarity score corresponding to the initial value of the quality factor of the image is less than the threshold of the similarity score, until a similarity score corresponding to an increased initial value of the quality factor of the image is greater than or equal to the threshold of the similarity score, and use the increased initial value of the quality factor of the image as the optimum quality factor of the image.

In some embodiments, in the image compression apparatus described above, the processing unit is further configured to use the initial value of the quality factor of the image as the optimum quality factor of the image when the similarity score corresponding to the initial value of the quality factor of the image is equal to the threshold of the similarity score.

In some embodiments, in the image compression apparatus described above, the first acquiring module is specifically configured to use an empirical initial quality factor of the image as the first quality factor; set the first similarity score corresponding to the first quality factor to 1; choose the second quality factor that is less than the first quality factor by a preset level; and acquire the second similarity score corresponding to the second quality factor by means of objective evaluation.

According to the image compression method and apparatus provided in the embodiments of the present disclosure, a first quality factor of an image, a first similarity score corresponding to the first quality factor, a second quality factor of the image, and a second similarity score corresponding to the second quality factor are acquired; a functional relationship between a quality factor and a similarity score is obtained by means of curve fitting using the first quality factor, the first similarity score, the second quality factor, and the second similarity score; and an optimum quality factor of the image is acquired according to the functional relationship between the quality factor and the similarity score and a threshold of the similarity score. In the technical features of the embodiments of the present disclosure, a functional relationship between a quality factor and a similarity score may be obtained by means of curve fitting according to existing experimental data for analysis, and moreover, an optimum quality factor of an image can be acquired according to the functional relationship, so that iterations in image compression can be completed in a short time, thereby improving processing efficiency of image compression. Because image compression in the technical features of the embodiments of the present disclosure only takes an extremely short time, the technical features may be applied to various applications on the Internet, for example, the technical features can help actually reduce the amount of bandwidth of websites, reduce a loading time of a webpage, and improve processing efficiency of image compression on a website.

BRIEF DESCRIPTION OF THE DRAWINGS

To illustrate the technical features in the embodiments of the present disclosure more clearly, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DESCRIPTION OF EMBODIMENTS

To make the objectives, technical features, and advantages of the present disclosure clearer, the following further describes the implementation manners of the present disclosure in detail with reference to the accompanying drawings.

Embodiment 1

Figure 1:
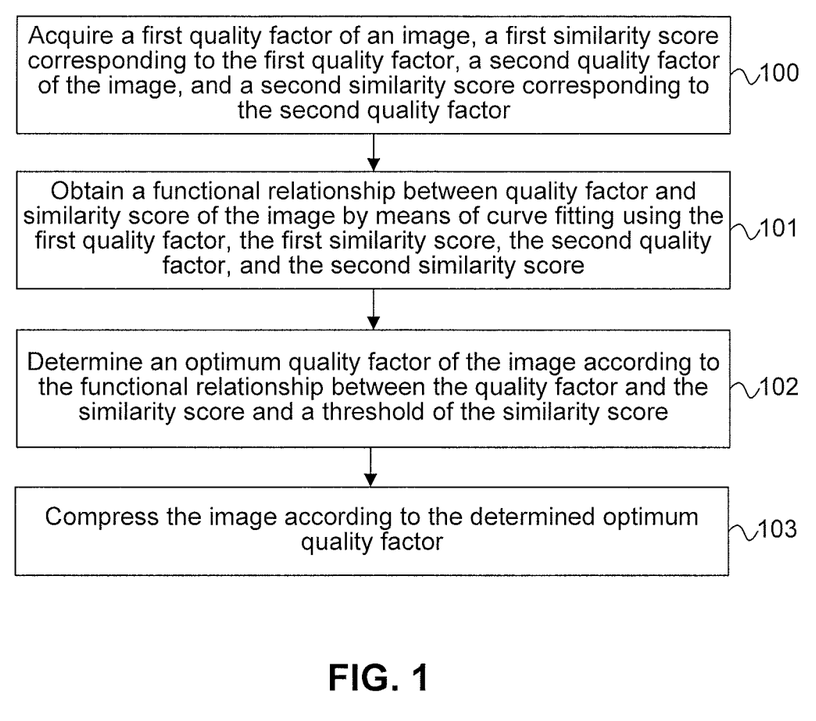
FIG. 1 is a flowchart of an image compression method according to Embodiment 1 of the present disclosure.

FIG. 1 is a flowchart of an image compression method according to Embodiment 1 of the present disclosure. As shown in FIG. 1, the image compression method of this embodiment may specifically include the following steps:

Step 100: Acquire a first quality factor of an image, a first similarity score corresponding to the first quality factor, a second quality factor of the image, and a second similarity score corresponding to the second quality factor.

For example, the first similarity score is used for identifying similarity between an image compressed by using the first quality factor and an original image (that is, an image before compression); and the second similarity score is used for identifying similarity between an image compressed by using the second quality factor and an original image. For ease of description, the similarity score may be a value between 0 and 1. A higher the similarity score indicates that the compressed image is more similar to the original image, and on the contrary, a lower the similarity score indicates that the compressed image is less similar to the original image. The similarity score may be represented by s (score), and the quality factor may be represented by q (quality).

Before step 100, this embodiment may further include: acquiring a threshold of a similarity score of the image. The threshold of the similarity score of the image may be set by technical personnel and may be an empirical value, and the threshold of the similarity score of the image may be used as a criterion for measuring the quality factor.

Step 101: Obtain a functional relationship between a quality factor and a similarity score by means of curve fitting using the first quality factor, the first similarity score, the second quality factor, and the second similarity score.

For example, in this embodiment, the first quality factor and the first similarity score, and the second quality factor and the second similarity score are separately used as two points to which the functional relationship between the quality factor and the similarity score is fit. In this embodiment, the fit is obtained by using the two points in the functional relationship between the quality factor and the similarity score, and the functional relationship between the quality factor and the similarity score is determined.

Step 102: Determine an optimum quality factor of the image according to the functional relationship between the quality factor and the similarity score and a threshold of the similarity score.

In this embodiment, an entity for executing the image compression method is an image compression apparatus, for example, the image compression apparatus may be disposed in a server of a website or other terminals, so as to implement functions thereof.

Step 103: Compress the image according to the determined optimum quality factor.

According to the image compression method of this embodiment, a first quality factor of an image, a first similarity score corresponding to the first quality factor, a second quality factor of the image, and a second similarity score corresponding to the second quality factor are acquired; and a functional relationship between a quality factor and a similarity score is obtained by means of curve fitting using the first quality factor, the first similarity score, the second quality factor, and the second similarity score; and an optimum quality factor of the image is acquired according to the functional relationship between the quality factor and the similarity score and a threshold of the similarity score. In the technical features of this embodiment, a functional relationship between a quality factor and a similarity score may be obtained by curve fitting according to existing experimental data for analysis, and moreover, an optimum quality factor of an image can be acquired according to the functional relationship, so that iterations in image compression can be completed in a short time, thereby improving processing efficiency of image compression. Because image compression in the technical features of this embodiment only takes an extremely short time, the technical features may be applied to various applications on the Internet, for example, the technical features can help actually reduce the amount of bandwidth of websites, reduce a loading time of a webpage, and improve processing efficiency of image compression on a website.

In some embodiments, on the basis of the technical features of the embodiment shown in FIG. 1, step 101 of "obtaining a functional relationship between a quality factor and a similarity score by means of curve fitting using the first quality factor, the first similarity score, the second quality factor, and the second similarity score" may specifically include: determining a Gaussian functional relationship between the quality factor and the similarity score according to the first quality factor, the first similarity score, the second quality factor, the second similarity score, and a Gaussian function.

For example, by analyzing multiple groups of experimental data about the quality factor and similarity score in the conventional technology, it may be found that the functional relationship between the quality factor q and the similarity score s is approximate to a Gaussian function. For example, the Gaussian function may be expressed as $$q(s) = \frac{k}{\sigma\sqrt{2\pi}} e^{-\frac{(s-1)^2}{2\sigma^2}},$$

where $\sigma$ represents a parameter in the Gaussian function and is used to describe the quantity of discrete data in Gaussian distribution, and k represents a total variance. For details, reference may be made to the related conventional technology, which is not described herein again.

In some embodiments, the step of determining a Gaussian functional relationship between the quality factor and the similarity score according to the first quality factor, the first similarity score, the second quality factor, the second similarity score, and a Gaussian function may specifically include the following steps:

(1) Separately use the first quality factor and the first similarity score, and the second quality factor and the second similarity score as values of two end points of the Gaussian function; and determine a coefficient parameter of the Gaussian function.

(2) Determine the Gaussian functional relationship between the quality factor and the similarity score according to the coefficient parameter of the Gaussian function.

In this embodiment, the first quality factor and the first similarity score are one end point of the Gaussian function, and the second quality factor and the second similarity score are another end point of the Gaussian function; and the coefficient parameter of the Gaussian function may be determined by substituting values of the two end points into the Gaussian function $$q(s) = \frac{k}{\sigma\sqrt{2\pi}} e^{-\frac{(s-1)^2}{2\sigma^2}},$$

so that the Gaussian functional relationship between the quality factor and the similarity score may be determined. Alternatively, an inverse function s(q) of the Gaussian function q(s) may further be obtained.

In this embodiment, by analyzing data of quality factors in the conventional technology and similarity scores that are corresponding to the quality factors and calculated by means of objective evaluation, it may be found that the relationship between the quality factor and the similarity score is that the similarity score being an increasing function of the quality factor, for example, specifically may be an increasing function approximate to a Gaussian function. Therefore, in the technical features of this embodiment, an example in which a Gaussian function is fit to the quality factor and the similarity score is used for describing the technical features of the present disclosure. In actual applications, other functions that are combined with a functional relationship between the quality factor and the similarity score may further be fit to the quality factor and the similarity score, which are described herein one by one.

Step 102 of "determining an optimum quality factor of the image according to the functional relationship between the quality factor and the similarity score and a threshold of the similarity score" may specifically include: acquiring the optimum quality factor of the image according to the Gaussian functional relationship between the quality factor and the similarity score and the threshold of the similarity score.

In some embodiments, the step of "acquiring the optimum quality factor of the image according to the Gaussian functional relationship between the quality factor and the similarity score and the threshold of the similarity score" may specifically include:

(a) Calculate an initial value of the quality factor of the image by substituting the threshold $s^*$ of the similarity score into the Gaussian functional relationship between the quality factor and the similarity score.

In this embodiment, the threshold $s^*$ of the similarity score is an expected value of the similarity score. The initial value of the quality factor of the image corresponding to the threshold $s^*$ of the similarity score may be determined by substituting the threshold $s^*$ of the similarity score into the determined Gaussian functional relationship $q(s)$ between the quality factor and the similarity score.

(b) Acquire a similarity score corresponding to the initial value of the quality factor by means of objective evaluation.

In this embodiment, the similarity score corresponding to the initial value of the quality factor is further calculated by using an existing objective evaluation method. For the objective evaluation method, reference may specifically be made to the related conventional technology, for example, reference may specifically be made to a related calculation method in the file *A Novel Perceptual Image Quality Measure for Block Based Image Compression* in the ICVT conference in 2011, or reference may further be made to other existing calculation methods for objective evaluation, which are not described herein again.

(c) Determine whether the similarity score corresponding to the initial value of the quality factor of the image is greater than the threshold of the similarity score; perform step (d) when the similarity score corresponding to the initial value of the quality factor of the image is greater than the threshold of the similarity score; perform step (e) to increase the initial value of the quality factor of the image when the similarity score corresponding to the initial value of the quality factor of the image is less than the threshold of the similarity score; or perform step (f) when the similarity score corresponding to the initial value of the quality factor of the image is equal to the threshold of the similarity score.

(d) Reduce the initial value of the quality factor of the image, until a similarity score corresponding to a reduced initial value of the quality factor of the image is less than or equal to the threshold of the similarity score, and use the reduced initial value of the quality factor of the image as the optimum quality factor of the image.

(e) Increase the initial value of the quality factor of the image when the similarity score corresponding to the initial value of the quality factor of the image is less than the threshold of the similarity score, until a similarity score corresponding to an increased initial value of the quality factor of the image is greater than or equal to the threshold of the similarity score, and use the increased initial value of the quality factor of the image as the optimum quality factor of the image.

(f) Use the initial value of the quality factor of the image as the optimum quality factor of the image.

In some embodiments, in the embodiment shown in FIG. 1, step 100 of "acquiring a first quality factor of an image, a first similarity score corresponding to the first quality factor, a second quality factor of the image, and a second similarity score corresponding to the second quality factor" may specifically include the following steps:

(1) Use an empirical initial quality factor of the image as the first quality factor.

(2) Set the first similarity score corresponding to the first quality factor to 1.

(3) Choose the second quality factor that is less than the first quality factor by a preset level (e.g., 50%).

(4) Acquire the second similarity score corresponding to the second quality factor by means of objective evaluation.

In this embodiment, an empirical initial quality factor of an image in the conventional technology may be used as the first quality factor, for example, the first quality factor may be q0, and the first similarity score corresponding to the first quality factor may be s=1; and when q0=80, the value of s0 may be 1. Specifically, a distribution diagram of s may be ignored when q is greater than q0, and only a situations in which q is less than q0 is considered, so that q' less than q0 may be used, for example, q'=60, and then, a second similarity score s(q=60) corresponding to q' is calculated by using the existing objective evaluation method.

Further, referring to the steps of the foregoing embodiment, according to (s0, q0), (s', q'), and the Gaussian function $$q(s) = \frac{k}{\sigma\sqrt{2\pi}} e^{-\frac{(s-1)^2}{2\sigma^2}},$$

a coefficient parameter of the Gaussian functional relationship may be determined, so as to determine a Gaussian functional relationship that the quality factor and the similarity score meet.

It should be noted that, all the optional technical features in the foregoing embodiment may be combined randomly to form optional embodiments of the present disclosure. For details, reference may be made to the description of the foregoing embodiment, which is not described herein again.

According to the image compression method of the foregoing embodiment, a functional relationship between a quality factor and a similarity score may be obtained by means of curve fitting according to existing experimental data for analysis, and moreover, an optimum quality factor of an image may be acquired according to the Gaussian functional relationship, so that iterations in image compression can be completed in a short time, thereby improving processing efficiency of image compression. Because image compression in the technical features of this embodiment only takes an extremely short time, the technical features may be applied to various applications on the Internet, for example, the technical features can help actually reduce the amount of bandwidth of websites, reduce a loading time of a webpage, and improve processing efficiency of image compression on a website.

Embodiment 2

Figure 2:
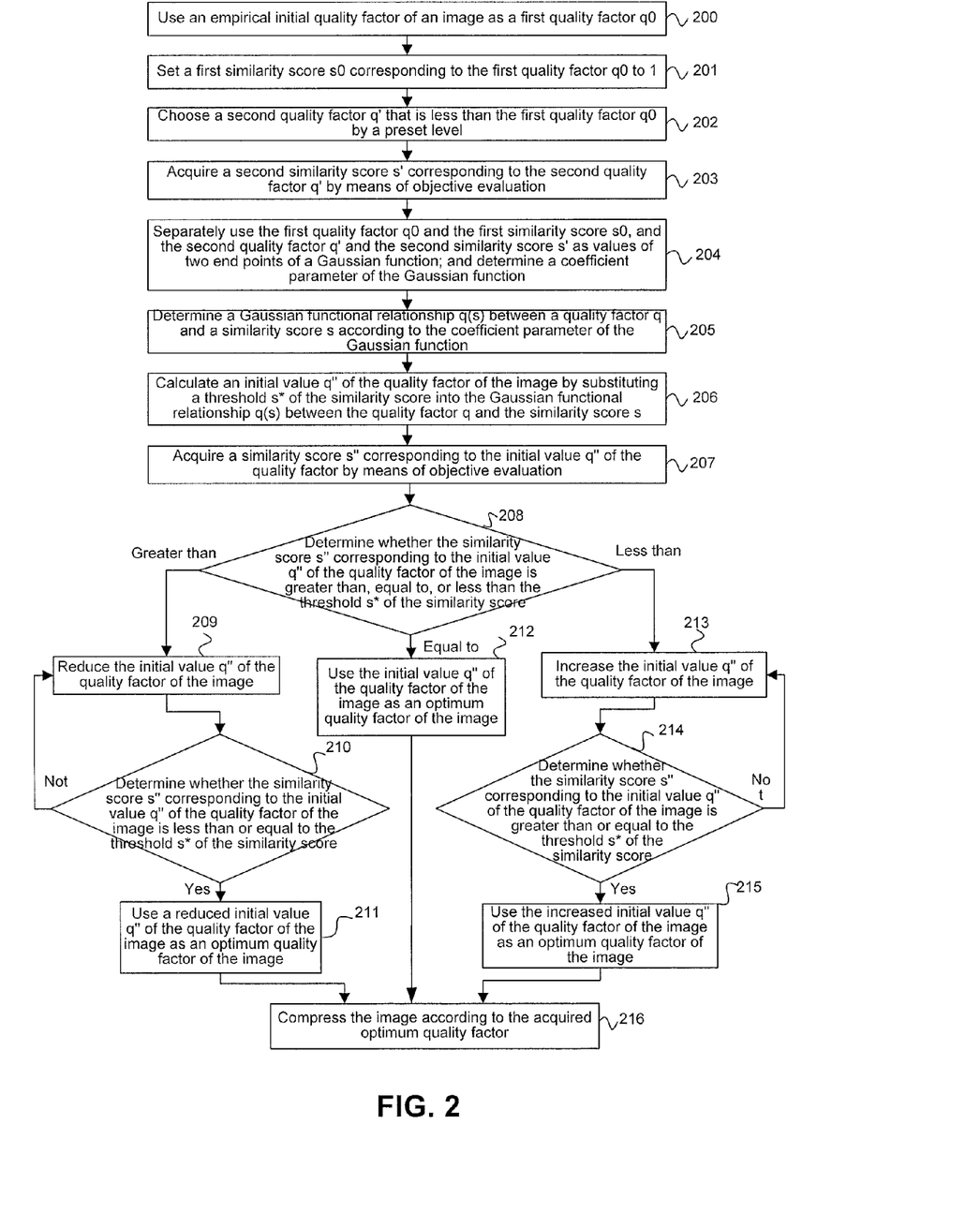
FIG. 2 is a flowchart of an image compression method according to Embodiment 2 of the present disclosure.

FIG. 2 is a flowchart of an image compression method according to Embodiment 2 of the present disclosure. As shown in FIG. 2, in the image compression method of this embodiment, the technical features of this embodiment of the present disclosure is further described in detail on the basis of the foregoing embodiment. The image compression method of this embodiment may specifically include the following steps:

Step 200: Use an empirical initial quality factor of the image as a first quality factor q0.

For example, in this embodiment, q0=80.

Step 201: Set a first similarity score s0 corresponding to the first quality factor q0 to 1.

Step 202: Acquire a second quality factor q' that is less than the first quality factor q0.

For example, in this embodiment, q'=60. In this embodiment, a distribution diagram of s is ignored when q is greater than q0. Therefore, q' is less than q0.

Step 203: Acquire a second similarity score s' corresponding to the second quality factor q' by means of objective evaluation.

Step 204: Separately use the first quality factor q0 and the first similarity score s0, and the second quality factor q' and the second similarity score s' as values of two end points of a Gaussian function; and determine a coefficient parameter of the Gaussian function.

Step 205: Determine a Gaussian functional relationship q(s) between a quality factor q and a similarity score s according to the coefficient parameter of the Gaussian function.

Figure 3:
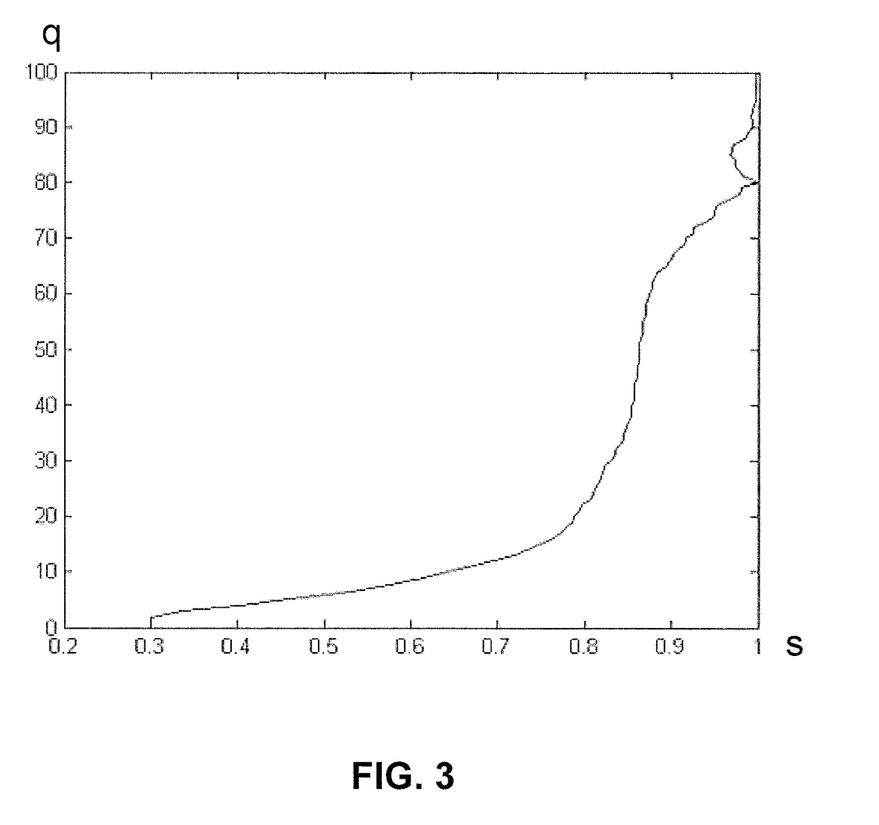
FIG. 3 is a diagram of a Gaussian functional relationship between a quality factor q and a similarity score s in an embodiment of the present disclosure.

For example, the Gaussian functional relationship between q and s that is determined according to the foregoing method is shown in FIG. 3.

Step 206: Calculate an initial value q" of the quality factor of the image by substituting a threshold s* of the similarity score into the Gaussian functional relationship q(s) between the quality factor q and the similarity score s.

Step 207: Acquire a similarity score s" corresponding to the initial value q" of the quality factor by means of objective evaluation.

Step 208: Determine whether the similarity score s" corresponding to the initial value q" of the quality factor of the image is greater than, equal to, or less than the threshold s* of the similarity score; perform step 209 when the similarity score s" corresponding to the initial value q" of the quality factor of the image is greater than the threshold s* of the similarity score; perform step 212 when the similarity score s" corresponding to the initial value q" of the quality factor of the image is equal to the threshold s* of the similarity score; or perform step 213 when the similarity score s" corresponding to the initial value q" of the quality factor of the image is less than the threshold s* of the similarity score.

Step 209: Reduce the initial value q" of the quality factor of the image, and perform step 210.

In this embodiment, the initial value q" of the quality factor of the image may be reduced by using a preset step d, that is, q"=q"−d.

Step 210: Determine whether the similarity score s" corresponding to the initial value q" of the quality factor of the image is less than or equal to the threshold s* of the similarity score; perform step 211 when the similarity score s" corresponding to the initial value q" of the quality factor of the image is less than or equal to the threshold s* of the similarity score; or otherwise, perform step 209.

Step 211: Use a reduced initial value q" of the quality factor of the image as an optimum quality factor of the image, and perform step 216.

Step 212: Use the initial value q" of the quality factor of the image as an optimum quality factor of the image, and perform step 216.

Step 213: Increase the initial value q" of the quality factor of the image, and perform step 214.

In this embodiment, the initial value q" of the quality factor of the image may be increased by using a preset step d, that is, q"=q"+d.

Step 214: Determine whether the similarity score s" corresponding to the initial value q" of the quality factor of the image is greater than or equal to the threshold s* of the similarity score; perform step 215 when the similarity score s" corresponding to the initial value q" of the quality factor of the image is greater than or equal to the threshold s* of the similarity score; or otherwise, perform step 213.

Step 215: Use an increased initial value q" of the quality factor of the image as an optimum quality factor of the image, and perform step 216.

Step 216: Compress the image according to the determined optimum quality factor.

Similar to the foregoing embodiment, an entity for executing the image compression method of this embodiment is still an image compression apparatus.

The optimum quality factor of the image determined by using the foregoing method of this embodiment is an image quality factor closest to an ideal value, and therefore, iterations in image compression can be completed in a short time, thereby improving processing efficiency of image compression. Because image compression in the technical features of this embodiment only takes an extremely short time, the technical features may be applied to various applications on the Internet, for example, the technical features can help actually reduce the amount of bandwidth of websites, reduce a loading time of a webpage, and improve processing efficiency of image compression on a website.

Embodiment 3

Figure 4:
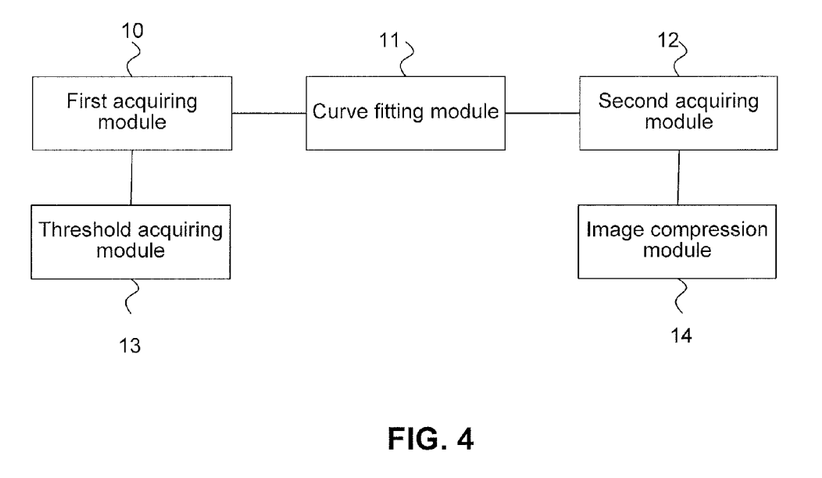
FIG. 4 is a schematic structural diagram of an image compression apparatus according to Embodiment 3 of the present disclosure.

FIG. 4 is a schematic structural diagram of an image compression apparatus according to Embodiment 3 of the present disclosure. As shown in FIG. 4, the image compression apparatus of this embodiment may specifically include one or more processors; memory; and one or more program modules stored in the memory and to be executed by the one or more processors, the one or more program modules further including: a first acquiring module 10, a curve fitting module 11, a second acquiring module 12, a threshold acquiring module 13, and an image compression module 14.

The threshold acquiring module 13 is configured to acquire a threshold of a similarity score of an image; the threshold acquiring module 13 is connected to the first acquiring module 10; the first acquiring module 10 is configured to acquire a first quality factor of the image, a similarity score corresponding to the first quality factor, a second quality factor of the image, and a second similarity score corresponding to the second quality factor; the curve fitting module 11 is connected to the first acquiring module 10 and is configured to obtain a functional relationship between quality factor and similarity score of the image by means of curve fitting using the first quality factor, the first similarity score, the second quality factor, and the second similarity score that are acquired by the first acquiring module 10; the second acquiring module 12 is connected to the curve fitting module 11 and is configured to determine an optimum quality factor of the image according to the functional relationship between the quality factor and the similarity score obtained by the curve fitting module 11 by means of curve fitting and the threshold of the similarity score; the image compression module 14 is connected to the second acquiring module 12 and is configured to compress the image according to the determined optimum quality factor.

In the image compression apparatus of this embodiment, an implementation mechanism of image compression by using the foregoing modules is same with the implementation mechanism in the foregoing related method embodiment. For details, reference may be made to the description of the foregoing related method embodiment, which is not described herein again.

The image compression apparatus of this embodiment uses the foregoing modules to acquire a first quality factor of an image, a first similarity score corresponding to the first quality factor, a second quality factor of the image, and a second similarity score corresponding to the second quality factor; obtain a functional relationship between a quality factor and a similarity score by means of curve fitting using the first quality factor, the first similarity score, the second quality factor, and the second similarity score; and determine an optimum quality factor of the image according to the functional relationship between the quality factor and the similarity score and a threshold of the similarity score. In the technical features of this embodiment, a functional relationship between a quality factor and a similarity score may be obtained by means of curve fitting according to existing experimental data for analysis, and moreover, an optimum quality factor of an image can be acquired according to the functional relationship, so that iterations in image compression can be completed in a short time, thereby improving processing efficiency of image compression. Because image compression in the technical features of this embodiment only takes an extremely short time, the technical features may be applied to various applications on the Internet, for example, the technical features can help actually reduce the amount of bandwidth of websites, reduce a loading time of a webpage, and improve processing efficiency of image compression on a website.

Embodiment 4

Figure 5:
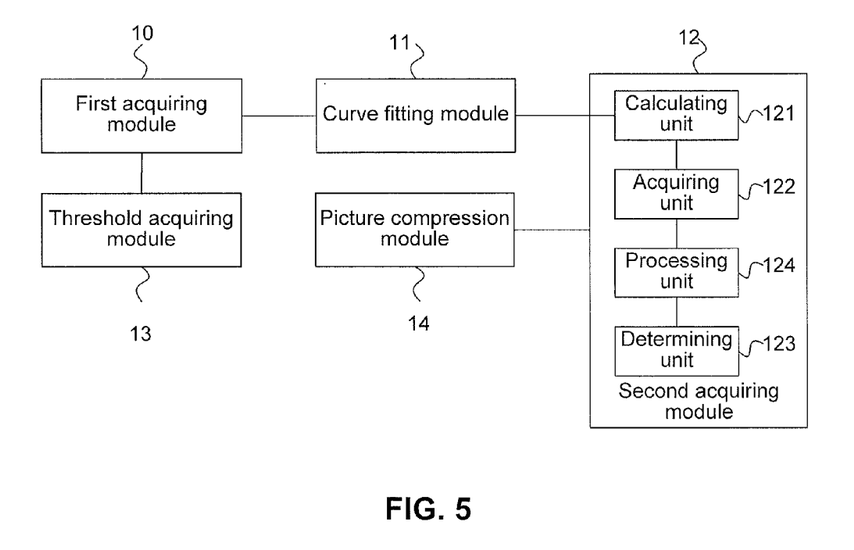
FIG. 5 is a schematic structural diagram of an image compression apparatus according to Embodiment 4 of the present disclosure.

FIG. 5 is a schematic structural diagram of an image compression apparatus according to Embodiment 4 of the present disclosure. As shown in FIG. 5, on the basis of the embodiment shown in FIG. 4, the image compression apparatus of this embodiment may further include the following technical features.

In this embodiment, a curve fitting module 11 is specifically configured to determine a Gaussian functional relationship between a quality factor and a similarity score according to a first quality factor, a first similarity score, a second quality factor, and a second similarity score that are acquired by a first acquiring module 10, and a Gaussian function; and a second acquiring module 12 is specifically configured to acquire an optimum quality factor of an image according to the Gaussian functional relationship between the quality factor and the similarity score obtained by the curve fitting module 11 by means of curve fitting and a threshold of the similarity score.

In some embodiments, for example, the curve fitting module 11 may be specifically configured to separately use the first quality factor and the first similarity score, and the second quality factor and the second similarity score as values of two end points of the Gaussian function; determine a coefficient parameter of the Gaussian function; and determine the Gaussian functional relationship between the quality factor and the similarity score according to the coefficient parameter of the Gaussian function.

In some embodiments, the second acquiring module 12 may specifically include a calculating unit 121, an acquiring unit 122, a determining unit 123, and a processing unit 124.

The calculating unit 121 is connected to the curve fitting module 11 and is configured to calculate an initial value of the quality factor of the image by substituting the threshold of the similarity score into the Gaussian functional relationship between the quality factor and the similarity score obtained by the curve fitting module 11 by means of curve fitting; the acquiring unit 122 is connected to the calculating unit 121 and is configured to acquire, by means of objective evaluation, a similarity score corresponding to the initial value of the quality factor calculated by the calculating unit 121; the determining unit 123 is connected to the acquiring unit 122 and is configured to determine whether the similarity score corresponding to the initial value of the quality factor of the image acquired by the acquiring unit 122 is greater than the threshold of the similarity score; the processing unit 124 is connected to the determining unit 123 and is configured to reduce the initial value of the quality factor of the image when the determining unit 123 determines that the similarity score corresponding to the initial value of the quality factor of the image is greater than the threshold of the similarity score, until a similarity score corresponding to a reduced initial value of the quality factor of the image is less than or equal to the threshold of the similarity score, and use the reduced initial value of the quality factor of the image as the optimum quality factor of the image.

Alternatively, further optionally, the processing unit 124 is further configured to increase the initial value of the quality factor of the image when the determining unit 123 determines that the similarity score corresponding to the initial value of the quality factor of the image is less than the threshold of the similarity score, until a similarity score corresponding to an increased initial value of the quality factor of the image is greater than or equal to the threshold of the similarity score, and use the increased initial value of the quality factor of the image as the optimum quality factor of the image. Alternatively, the processing unit 124 is further configured to use the initial value of the quality factor of the image as the optimum quality factor of the image when the determining unit 123 determines that the similarity score corresponding to the initial value of the quality factor of the image is equal to the threshold of the similarity score.

In some embodiments, the first acquiring module 10 in the foregoing embodiment is specifically configured to use an empirical initial quality factor of the image as the first quality factor; set the first similarity score corresponding to the first quality factor to 1; choose the second quality factor that is less than the first quality factor by a preset level; and acquire the second similarity score corresponding to the second quality factor by means of objective evaluation.

It should be noted that, all the optional technical features in this embodiment may be combined randomly to form optional embodiments of the present disclosure. For details, reference may be made to the description of the foregoing embodiment, which is not described herein again.

In the image compression apparatus of this embodiment, an implementation mechanism of image compression by using the foregoing modules is same with the implementation mechanism in the foregoing related method embodiment. For details, reference may be made to the description of the foregoing related method embodiment, which is not described herein again.

The image compression apparatus of this embodiment may use the foregoing modules to a obtain a functional relationship between a quality factor and a similarity score by means of curve fitting according to existing experimental data for analysis, and moreover, can acquire an optimum quality factor of an image according to the Gaussian functional relationship, so that iterations in image compression can be completed in a short time, thereby improving processing efficiency of image compression. Because image compression in the technical features of this embodiment only takes an extremely short time, the technical features may be applied to various applications on the Internet, for example, the technical features can help actually reduce the amount of bandwidth of websites, reduce a loading time of a webpage, and improve processing efficiency of image compression on a website.

The image compression apparatus of this embodiment may be specifically disposed in a terminal or server capable of performing image compression processing, which is not limited by the present disclosure.

It should be noted that, when the image compression apparatus provided by the foregoing embodiment acquires a quality factor in image compression, division of the foregoing functional modules is only described as an example. In actual applications, the functions may be allocated to different functional modules as required, that is, the internal structure of the apparatus is divided into different functional modules to complete all or some of the functions described above. In addition, the image compression apparatus provided by the foregoing embodiment belongs to a same conception as the image compression method in the foregoing embodiment. For a specific implementation process of the image compression apparatus, refer to the method embodiment, and the details are not described herein again.

The sequence numbers of the foregoing embodiments of the present disclosure are merely for description, and do not imply the preference among the embodiments.

Figure 6:
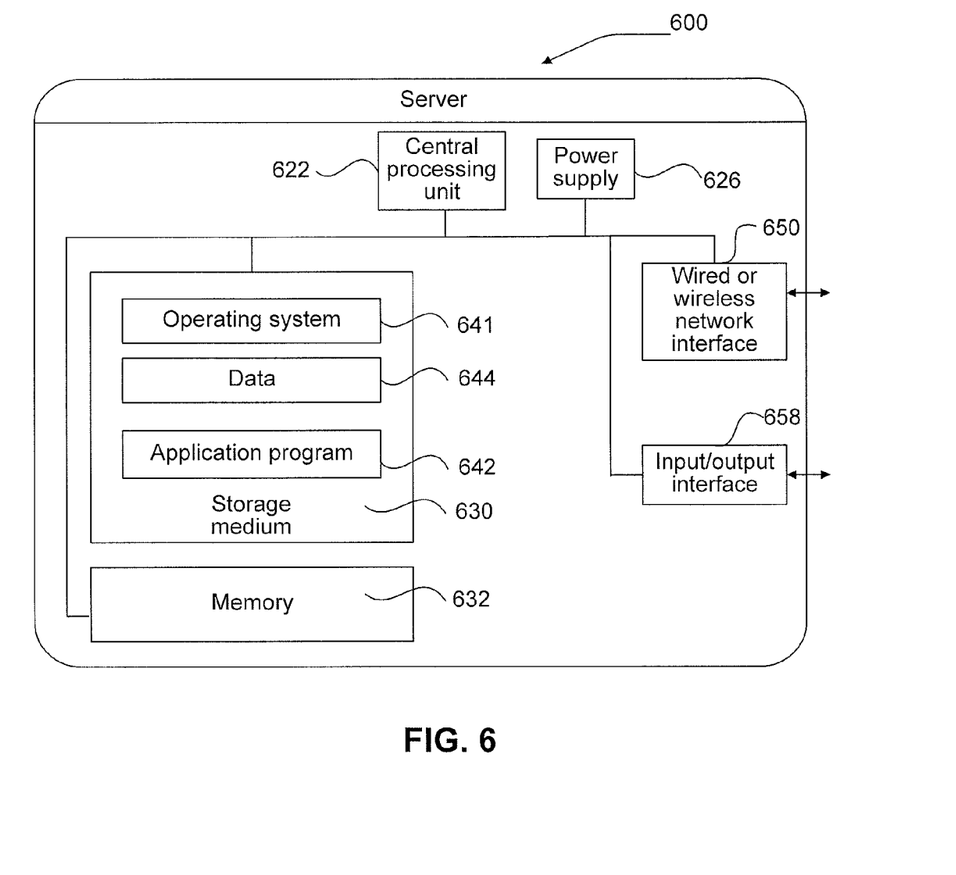
FIG. 6 is a schematic structural diagram of a server provided in an embodiment of the present disclosure.

FIG. 6 is a schematic structural diagram of a server according to an embodiment of the present disclosure. The server 600 may vary significantly due to different configurations or performance, and may include one or more central processing units (CPUs) 622 (for example, one or more processors), a memory 632, and one or more storage media 630 (for example, one or more mass storage devices) for storing an application program 642 or data 644. The memory 632 and the storage medium 630 may be transitory or permanent storage. The program stored in the storage medium 630 may include one or more modules (not shown in the figure) and each module may include a series of instructional operations on the server. Further, the CPU 622 may be configured to communicate with the storage medium 630, and perform, on the server 600, a series of instructional operations in the storage medium 630. The server 600 may further include one or more power supplies 626, one or more wired or wireless network interfaces 650, one or more input/output interfaces 658, and/or one or more operating systems 641, such as Windows Server™, Mac OS X™, Unix™, Linux™, and FreeBSD™. The methods in the foregoing embodiments may be implemented by the components of the server.

When the method for image compression is implemented in a form of software function module and sold or used as an independent product, the method may also be stored in a non-transitory computer readable storage medium for execution by one or more processors of a computer. A person skilled in the art should understand that the embodiments of the present disclosure may be provided as a method, a system or a computer program product. Therefore, the present disclosure may use a form of a hardware embodiment, a software embodiment, or an embodiment combining software and hardware. In addition, this present disclosure may use a form of a computer program product implemented on one or more computer available storage media including computer available program code, The storage media include but are not limited to a USB flash drive, a removable hard disk, a read-only memory (ROM), a random access memory (RAM), a disk memory, a CD-ROM, an optical memory, and the like.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A computer-implemented method for image compression, comprising:
   at a computer having one or more processors and memory for storing programs to be executed by the one or more processors:
   acquiring a threshold of a similarity score of an image;
   acquiring a first quality factor of the image, a first similarity score corresponding to the first quality factor, a second quality factor of the image, and a second similarity score corresponding to the second quality factor;
   obtaining a functional relationship between quality factor and similarity score of the image by means of curve fitting using the first quality factor, the first similarity score, the second quality factor, and the second similarity score;
   determining an optimum quality factor of the image according to the functional relationship between the quality factor and the similarity score and the threshold of the similarity score; and
   compressing the image according to the determined optimum quality factor.

2. The method according to claim 1, wherein the step of obtaining a functional relationship between quality factor and similarity score of the image by means of curve fitting using the first quality factor, the first similarity score, the second quality factor, and the second similarity score further comprises:
   determining a Gaussian functional relationship between the quality factor and the similarity score according to the first quality factor, the first similarity score, the second quality factor, the second similarity score, and a Gaussian function; and
   the step of determining an optimum quality factor of the image according to the functional relationship between the quality factor and the similarity score and the threshold of the similarity score further comprises:
   determining an optimum quality factor of the image according to the Gaussian functional relationship between the quality factor and the similarity score and the threshold of the similarity score.

3. The method according to claim 2, wherein the step of determining a Gaussian functional relationship between the quality factor and the similarity score according to the first quality factor, the first similarity score, the second quality factor, the second similarity score, and a Gaussian function further comprises:
   separately using the first quality factor and the first similarity score, and the second quality factor and the second similarity score as values of two end points of the Gaussian function;
   determining a coefficient parameter of the Gaussian function; and
   determining the Gaussian functional relationship between the quality factor and the similarity score according to the coefficient parameter of the Gaussian function.

4. The method according to claim 2, wherein the step of determining an optimum quality factor of the image according to the Gaussian functional relationship between the quality factor and the similarity score and the threshold of the similarity score comprises:

calculating an initial value of the quality factor of the image by substituting the threshold of the similarity score into the Gaussian functional relationship between the quality factor and the similarity score;

acquiring a similarity score corresponding to the initial value of the quality factor by means of objective evaluation;

determining whether the similarity score corresponding to the initial value of the quality factor of the image is greater than the threshold of the similarity score;

reducing the initial value of the quality factor of the image when the similarity score corresponding to the initial value of the quality factor of the image is greater than the threshold of the similarity score, until a similarity score corresponding to a reduced initial value of the quality factor of the image is less than or equal to the threshold of the similarity score; and using the reduced initial value of the quality factor of the image as the optimum quality factor of the image.

5. The method according to claim 4, further comprising:
increasing the initial value of the quality factor of the image when the similarity score corresponding to the initial value of the quality factor of the image is less than the threshold of the similarity score, until a similarity score corresponding to an increased initial value of the quality factor of the image is greater than or equal to the threshold of the similarity score; and using the increased initial value of the quality factor of the image as the optimum quality factor of the image.

6. The method according to claim 4, further comprising:
using the initial value of the quality factor of the image as the optimum quality factor of the image when the similarity score corresponding to the initial value of the quality factor of the image is equal to the threshold of the similarity score.

7. The method according to claim 1, wherein the step of acquiring a first quality factor of the image, a first similarity score corresponding to the first quality factor, a second quality factor of the image, and a second similarity score corresponding to the second quality factor comprises:

using an empirical initial quality factor of the image as the first quality factor;

setting the first similarity score corresponding to the first quality factor to 1;

choosing the second quality factor that is less than the first quality factor by a preset level; and acquiring the second similarity score corresponding to the second quality factor by means of objective evaluation.

8. An image compression apparatus, comprising:
one or more processors;
memory; and
one or more program modules stored in the memory and to be executed by the one or more processors, the one or more program modules further including:
a threshold acquiring module, configured to acquire a threshold of a similarity score of an image;
a first acquiring module, configured to acquire a first quality factor of the image, a first similarity score corresponding to the first quality factor, a second quality factor of the image, and a second similarity score corresponding to the second quality factor;
a curve fitting module, configured to obtain a functional relationship between quality factor and similarity score of the image by means of curve fitting using the first quality factor, the first similarity score, the second quality factor, and the second similarity score;

a second acquiring module, configured to determine an optimum quality factor of the image according to the functional relationship between the quality factor and the similarity score and the threshold of the similarity score; and an image compression module, configured to compress the image according to the determined optimum quality factor.

9. The apparatus according to claim 8, wherein the curve fitting module is specifically configured to determine a Gaussian functional relationship between the quality factor and the similarity score according to the first quality factor, the first similarity score, the second quality factor, the second similarity score, and a Gaussian function; and the second acquiring module is specifically configured to determine the optimum quality factor of the image according to the Gaussian functional relationship between the quality factor and the similarity score and the threshold of the similarity score.

10. The apparatus according to claim 9, wherein the curve fitting module is specifically configured to separately use the first quality factor and the first similarity score, and the second quality factor and the second similarity score as values of two end points of the Gaussian function; determine a coefficient parameter of the Gaussian function; and determine the Gaussian functional relationship between the quality factor and the similarity score according to the coefficient parameter of the Gaussian function.

11. The apparatus according to claim 9, wherein the second acquiring module further includes:

a calculating unit, configured to calculate an initial value of the quality factor of the image by substituting the threshold of the similarity score into the Gaussian functional relationship between the quality factor and the similarity score;

an acquiring unit, configured to acquire a similarity score corresponding to the initial value of the quality factor by means of objective evaluation;

a determining unit, configured to determine whether the similarity score corresponding to the initial value of the quality factor of the image is greater than the threshold of the similarity score; and a processing unit, configured to reduce the initial value of the quality factor of the image when the determining unit determines that the similarity score corresponding to the initial value of the quality factor of the image is greater than the threshold of the similarity score, until a similarity score corresponding to a reduced initial value of the quality factor of the image is less than or equal to the threshold of the similarity score, and use the reduced initial value of the quality factor of the image as the optimum quality factor of the image.

12. The apparatus according to claim 11, wherein the processing unit is further configured to increase the initial value of the quality factor of the image when the determining unit determines that the similarity score corresponding to the initial value of the quality factor of the image is less than the threshold of the similarity score, until a similarity score corresponding to an increased initial value of the quality factor of the image is greater than or equal to the threshold of the similarity score, and use the increased initial value of the quality factor of the image as the optimum quality factor of the image.

13. The apparatus according to claim 11, wherein the processing unit is further configured to use the initial value of the quality factor of the image as the optimum quality factor of the image when the similarity score corresponding to the initial value of the quality factor of the image is equal to the threshold of the similarity score.

14. The apparatus according to claim 8 wherein the first acquiring module is specifically configured to use an empirical initial quality factor of the image as the first quality factor;
   set the first similarity score corresponding to the first quality factor to 1; choose the second quality factor that is less than the first quality factor by a preset level; and acquire the second similarity score corresponding to the second quality factor by means of objective evaluation.

* * * * *